(12) United States Patent
Chong et al.

(10) Patent No.: US 10,069,823 B1
(45) Date of Patent: Sep. 4, 2018

(54) INDIRECT ACCESS CONTROL

(71) Applicant: Symantec Corporation, Mountain View, CA (US)

(72) Inventors: Brian Chong, Castro Valley, CA (US); Keith Newstadt, West Newton, MA (US); Sean Doherty, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 15/391,556

(22) Filed: Dec. 27, 2016

(51) Int. Cl.
  *H04L 29/06* (2006.01)
  *H04W 12/06* (2009.01)
(52) U.S. Cl.
  CPC ......... *H04L 63/0853* (2013.01); *H04W 12/06* (2013.01)
(58) Field of Classification Search
  CPC ..................... H04W 12/06; H04L 63/0853
  See application file for complete search history.

(56) References Cited

U.S. PATENT DOCUMENTS

| | | | | |
|---|---|---|---|---|
| 9,081,958 B2* | 7/2015 | Ramzan | ................ | G06F 21/55 |
| 2009/0328209 A1* | 12/2009 | Nachenberg | ........... | G06Q 10/10 |
| | | | | 726/22 |
| 2014/0317687 A1* | 10/2014 | Ukil | ...................... | H04L 63/105 |
| | | | | 726/3 |
| 2015/0135277 A1* | 5/2015 | Vij | ...................... | H04L 63/0892 |
| | | | | 726/4 |
| 2017/0054611 A1* | 2/2017 | Tiell | ................. | G06F 17/30598 |
| 2018/0077569 A1* | 3/2018 | Chao | ..................... | H04W 12/06 |
| 2018/0103039 A1* | 4/2018 | Thaler | ................... | H04L 63/101 |

OTHER PUBLICATIONS

Marti, S. and Garcia-Molina, H., 2006. Taxonomy of trust: Categorizing P2P reputation systems. Computer Networks, 50(4), pp. 472-484. (Year: 2006).*
Saied, Y.B., Olivereau, A., Zeghlache, D. and Laurent, M., 2013. Trust management system design for the Internet of Things: A context-aware and multi-service approach. Computers & Security, 39, pp. 351-365. (Year: 2013).*
Chen, D., Chang, G., Sun, D., Li, J., Jia, J. and Wang, X., 2011. TRM-IoT: A trust management model based on fuzzy reputation for internet of things. Computer Science and Information Systems, 8(4), pp. 1207-1228. (Year: 2011).*

(Continued)

*Primary Examiner* — James R Turchen
(74) *Attorney, Agent, or Firm* — Patent Law Works LLP (57) ABSTRACT

Indirect access control is performed between a requestor computing device and a requestee computing device. Peer data is transmitted from the requestor to the requestee that asserts that the requestor is trusted by a peer computing device. It is verified that the requestor has a first degree of trust with the peer. Next degree peer data is received from the peer that asserts that the peer is trusted by a next degree peer computing device. It is verified that the peer has a next degree of trust with the next degree peer. A trust score is calculated for the requestor based on the verification of the peer data and the next degree peer data, and an access level is granted to the requestor based on the trust score.

20 Claims, 5 Drawing Sheets

(56) References Cited

OTHER PUBLICATIONS

Nitti, M., Girau, R., Atzori, L., Iera, A. and Morabito, G., Sep. 2012. A subjective model for trustworthiness evaluation in the social internet of things. In Personal Indoor and Mobile Radio Communications (PIMRC), 2012 IEEE 23rd International Symposium on (pp. 18-23). IEEE. (Year: 2012).*

Nitti, M., Girau, R. and Atzori, L., 2013. Trustworthiness management in the social internet of things. IEEE Transactions on Knowledge & Data Engineering, (1), p. 1. (Year: 2013).*

Chen, R., Guo, J. and Bao, F., 2016. Trust management for SOA-based IoT and its application to service composition. IEEE Transactions on Services Computing, 9(3), pp. 482-495. (Year: 2016).*

Jayasinghe, U., Truong, N.B., Lee, G.M. and Um, T.W., Jul. 2016. Rpr: A trust computation model for social internet of things. 2016 Intl IEEE Conferences (pp. 930-937). IEEE (Year: 2016).*

Almenarez, Florina et al., "Developing a Model for Trust Management in Pervasive Devices," Pervasive Computing and Communication Security (PerSec 2006), Mar. 13, 2006, 20 pages.

Cahill, Vinny et al., "Using Trust for Secure Collaboration in Uncertain Environments," Apr. 3, 2003, 11 pages.

Chen, Ing-Ray, "Trust-based Service Management for Social Internet of Things Systems," IEEE Transactions on Dependable and Secure Computing, vol. 13, Issue 6, Nov.-Dec. 1, 2016, 14 pages.

Dimmock, Nathan E., "Using trust and risk for access control in Global Computing," Technical Report, No. 643, University of Cambridge, Aug. 2005, 145 pages.

Marmol, Felix Gomez et al., "Security threats scenarios in trust and reputation models for distributed systems," Computers & Security, vol. 28., Oct. 2009, pp. 545-556.

Marmol, Felix Gomez et al., "Towards pre-standardization of trust and reputation models for distributed and heterogeneous systems," Computer Standards & Interfaces, vol. 32 (2010), pp. 185-196.

* cited by examiner

INDIRECT ACCESS CONTROL

TECHNICAL FIELD

This disclosure pertains generally to machine to machine communication, and more specifically to access control amongst Internet of Things devices.

BACKGROUND

The Internet of Things (IoT) refers to a network of physical objects or "things" equipped with computing hardware and software, including the ability to connect to a network and run computer instructions. Household items such as smart thermostats and appliances, as well as sensor-equipped wearable devices, are a few examples of currently popular IoT devices. New IoT devices so known as smart devices or connected devices) are rapidly becoming available and adopted by household users. By the year 2017, the average number of connected devices per household is projected to grow to 25 devices, and to 50 devices by the year 2020. While some smart devices are largely stationary, oftentimes smart devices will have some level of mobility (e.g. a smartphone or wearable computing device that moves around as its owner does so, a connected vehicle, etc.).

As the breadth and depth of smart devices continues to expand into everyday life, there is an increasing burden in creating and maintaining connectivity of those devices to one another and to broader networks such as the Internet. Additionally, there is an increasing burden in creating and maintaining access control amongst those devices.

While both capacity and coverage of wireless networks have increased significantly in the past few decades, there are still large areas that are either not covered by today's wireless networks or have limited data capacity in areas. Global wireless coverage with unlimited data capacity at a reasonable cost may take several more years to come to fruition, if such a panacea exists at all. Accordingly, smart devices that rely on network connectivity (e.g. to the Internet) for authentication and access control purposes, may be particularly hampered when placed in, or are in transit through, underserved wireless network areas.

It would be desirable to address these issues.

SUMMARY

A requestee computing device receives peer data from a requestor computing device. The peer data asserts that the requestor computing device is trusted by one or more peer computing devices. The requestee computing device verifies that the requestor computing device has a first degree of trust with at least one specific peer computing device based on communication of the peer data with the one or more peer computing devices. The requestee computing device receives next degree peer data from the at least one specific peer computing device. The next degree peer data asserts that the at least one specific peer computing device is trusted by one or more next degree peer computing devices. The requestee computing device verifies that the at least one specific peer computing device has a next degree of trust with at least one specific next degree peer computing device based on communication of the next degree peer data with the one or more next degree peer computing devices. The requestee computing device calculates a trust score for the requestor computing device based on the verification of the peer data and the next degree peer data. The requestee computing device grants an access level to the requestor computing device based on the trust score.

In some embodiments, receiving next degree peer data and verifying that the at least one specific peer computing device has a next degree of trust is performed iteratively for each of a predefined number of successive peer degrees. In some embodiment, the predefined number is based on the requestee computing device having a common chain of peer computing devices, and the trust score is further based on a degree of separation between the requestor computing device and the requestee computing device. In some embodiments, the trust score is further based on a number of peer computing devices and next degree peer computing devices that are verified as directly or indirectly trusting the requestor computing device. In some embodiments, the trust score is further based on how long the first degree of trust and the next degree of trust have been maintained. In some embodiments, the requestor computing device, the one or more peer computing devices, the one or more next degree peer computing devices and the requestee computing device are smart devices capable of managing access control in coordination with a cloud service. In some embodiments, the available connectivity with the cloud service is determined. In some embodiments, the trust score is further based on the determined available connectivity with the cloud service. In some embodiments, the requestor computing device or the requestee computing device are a connected computerized vehicle and the access level is limited based on distance the connected computerized vehicle travels from an authentication point. In some embodiments, the peer data and the next degree peer data include metadata describing access control permissions respectively granted to the one or more peer computing devices and the one or more next degree peer computing devices.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
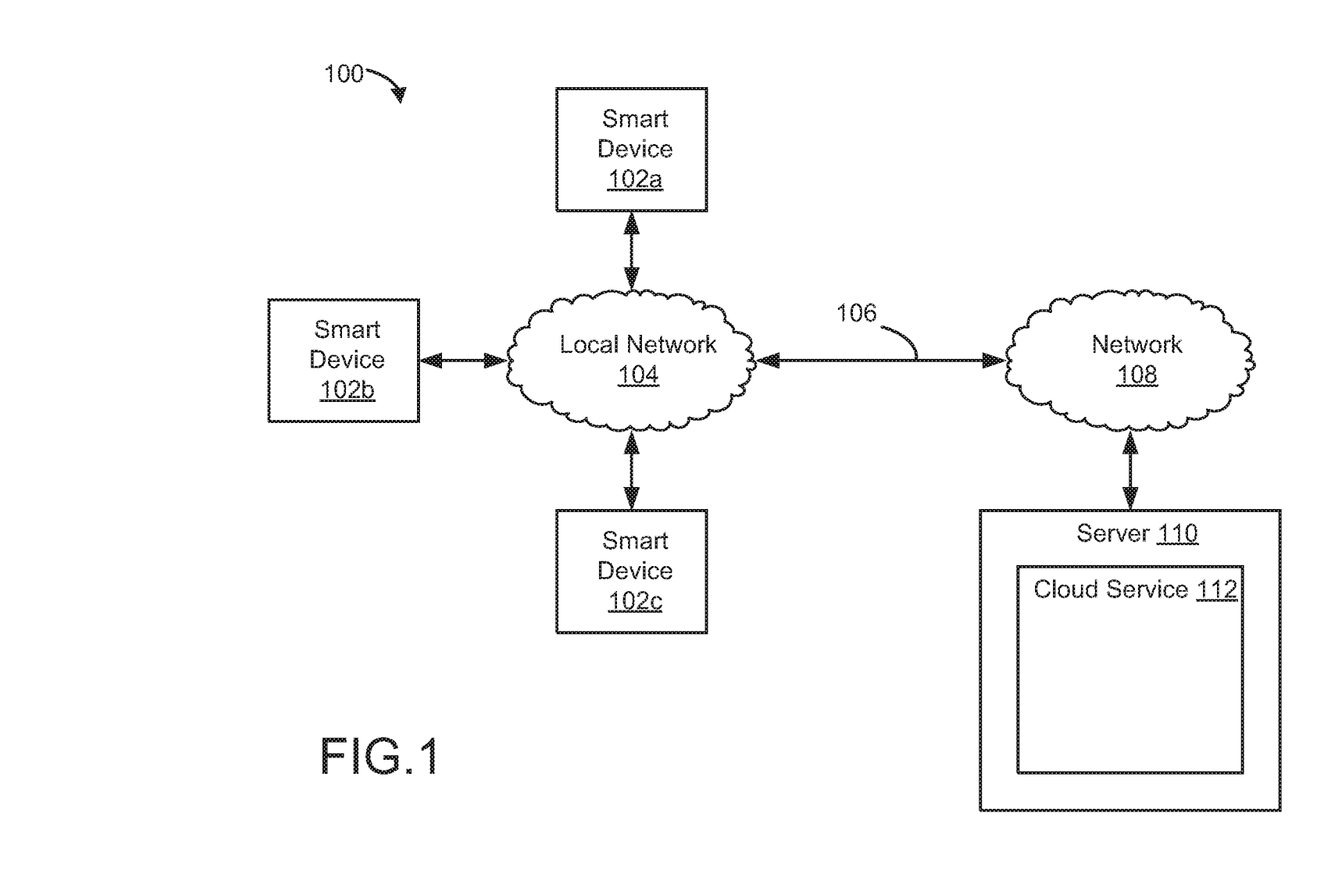
FIG. 1 is a block diagram illustrating an exemplary network architecture in which an indirect access control system can be implemented, according to some embodiments.

FIG. 1 is a block diagram illustrating an exemplary network architecture 100 in which an indirect access control system can be implemented. The illustrated network architecture 100 comprises multiple smart devices 102a, 102b and 102c. The smart devices 102 are connected through a local network 104, and the local network may be connected to another network 108 through a connection 106. Amongst other apparatus, a server 110 may be connected to the network 108, and the server 110 may host a cloud service 112 that is executed on the server 110.

The use of the smart devices 102 within the context of the indirect access control system is described in greater detail below in conjunction with FIGS. 3-5. Although Figure illustrates three clients 102 and one server 110 as an example, in practice many more (or fewer) clients 102 and/or servers 110 can be deployed. In one embodiment, network 108 is in the form of the Internet, and local network 104 is in the form of a local area network (LAN), personal area network (PAN) or other limited scale network technology. Example protocols that might be used for the local network 104 may include Ethernet, Wi-Fi, USB, INSTEON, IrDA, Wireless USB, Bluetooth, Z-Wave, ZigBee, Near-field communication (NFC), etc. Example protocols that might be used for the connection 106 between the local network 104 and the network 108 may include the Internet Protocol (IP), the Long-Term Evolution (LTE) wireless standard, IP over Digital Video Broadcasting (DVB), etc. Other networks or network-based environments can be used in other embodiments. For instance, in some embodiment a smart device 102 may have its own connection 106 to the network and a separate connection to the local network 104. In some embodiments, one smart device 102 may act as a gateway between the local network 104 and the network 108. Regardless, it should be understood that the depicted example is not the only embodiment and is provided to illustrate the principles discussed below.

In some cases, the connection 106 may be intermittently severed or otherwise unavailable. For example, with an LTE connection, a carrier may not have coverage in a particular part of the country or world. A satellite connection may lose connectivity due to rain fade or because of a loss of line-of-sight with between the satellite antenna and the corresponding satellite. Pricing mechanisms may also curtail availability of the connection 106. For example, a satellite Internet provider may limit the connection 106 to carrying a preset threshold amount of data per month. Once the threshold amount of data is exceed, the connection 106 may be effectively lost. Other reasons exist that may cause the connection 106 to be unavailable. As an example, a smart device 102 may lose network authentication settings to the network 108 (e.g. due to power loss, device reset, etc.).

The cloud service 112 may provide services to the smart devices 102. In particular, the cloud service 112 may provide access control services for the smart devices 102. For instance, the cloud service 112 may maintain access control lists for a smart device 102a that details the access permissions that another smart device 102b has on that smart device 102a. The cloud service 112 may also provide a mechanism to effectuate access, such as passing access tokens to the smart devices 102.

In some embodiments, access control may be maintained by the cloud service 112 in part based on a social network service. For instance, a connected vehicle may be logically associated with the owner's social network profile on the cloud service 112. Specific access permission may then be granted to other smart devices 102 associated with his social network profile (e.g. unlocking and starting the vehicle from his smart phone). Access permissions may also be granted to smart devices 102 associated with other peoples' social network profiles. For instance, the daughter of the vehicle owner, as identified through the social network service, may have access permissions to play music from her smart phone through the vehicle's audio system.

While having the cloud service 112 maintain access control for the devices 102 has certain advantages, due to the nature of the connection 106 discussed above, the access control provided by the cloud service 112 may not always be available. For example, when the connection 106 is lost, access control amongst the smart devices 102 may be restricted since a smart device 102a cannot determine whether another smart device 102 has access to a particular functionality without being communicatively connected to the access control mechanism of the cloud service 112. In some cases, this could present significant problems for users of smart devices 102 and may hinder their wide scale adoption. As an example, without a cloud based authentication mechanism available for a user of a connected vehicle on a remote stretch of highway, the user may not be able to unlock or start the vehicle with her smart phone.

Moreover, an initial association of a new smart device 102 is typically established between the new smart device 102 and the access control mechanism of the cloud service 112. With some devices 102, this initial association may be particularly difficult to accomplish due to inherent limitation of the device 102. For instance, a smart device 102 may not have a keyboard to enter a user name or password, or a display to guide the user through associating the device 102 with the access control mechanism of the cloud service 112. Moreover, a re-association of the device 102 with the access control mechanism of the cloud service 112 may be required if the device 102 loses the association with the access control mechanism, for example through a loss of power or reset.

Figure 2:
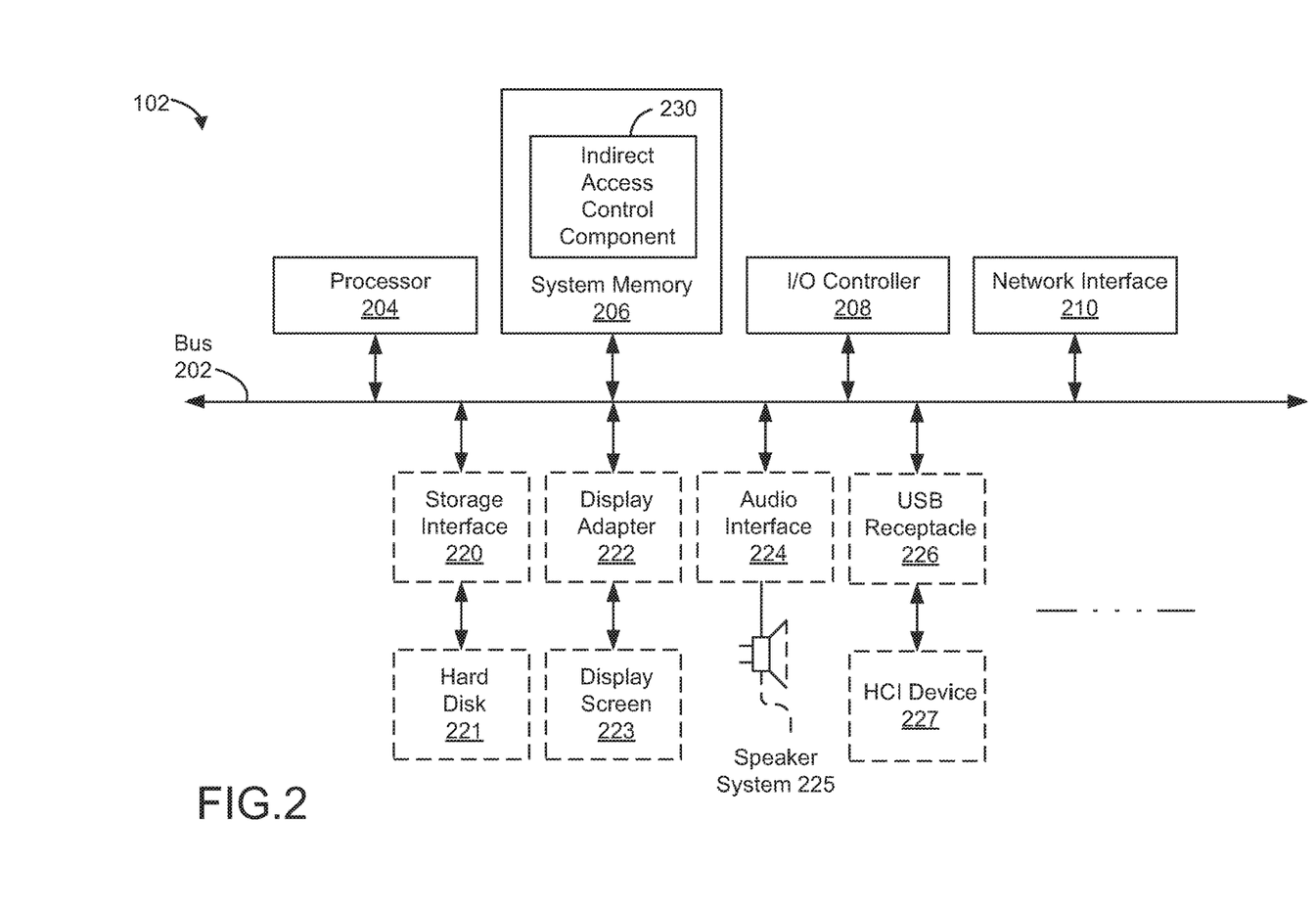
FIG. 2 is a block diagram of a computer system suitable for implementing an indirect access control system, according to some embodiments.

FIG. 2 is a block diagram of a computer system suitable for implementing an indirect access control system on a smart device 102. As illustrated, one component of the computer system 102 is a bus 202. The bus 202 communicatively couples other components of the computer system 102, such as at least one processor 204, system memory 206 (e.g., random access memory (RAM), read-only memory (ROM), flash memory), an input/output (I/O) controller 208 and a network interface 210. The network interface 210 may include a variety of protocols to connect to the local network 104 and/or the network 106 (e.g. the Internet). For instance, the network may be a Bluetooth interface, a Universal Mobile Telecommunication System (UMTS) interface, or an Institute of Electrical and Electronics Engineers' (IEEE) 802.11 Ethernet interface. In some embodiments, the computer system may have multiple network interfaces that provide connectivity to several types of networks concurrently or non-concurrently. The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 221, an audio output interface 224 communicatively coupled to an audio output device such as a speaker 225, and one or more interfaces such as a universal seral bus (USB) receptacle 226 communicatively coupled to various peripherals such as human-computer interaction (HCI) devices (e.g. keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location (i.e., a remotely located server 110), for example via the network interface 210. In FIG. 2, an indirect access component 230 is illustrated as residing in system memory 206. The workings of the indirect access component 230 are explained in greater detail below in conjunction with FIG. 3.

The storage interface 220 is coupled to one or more hard disks 221 (and/or other standard storage media). The hard disk(s) 221 may be a part of computer system 210, or may be physically separate and accessed through other interface systems.

The network interface 210 can be directly or indirectly communicatively coupled to a local network 104 and/or a network 108 such as the internet. Such coupling can be wired or wireless.

Figure 3:
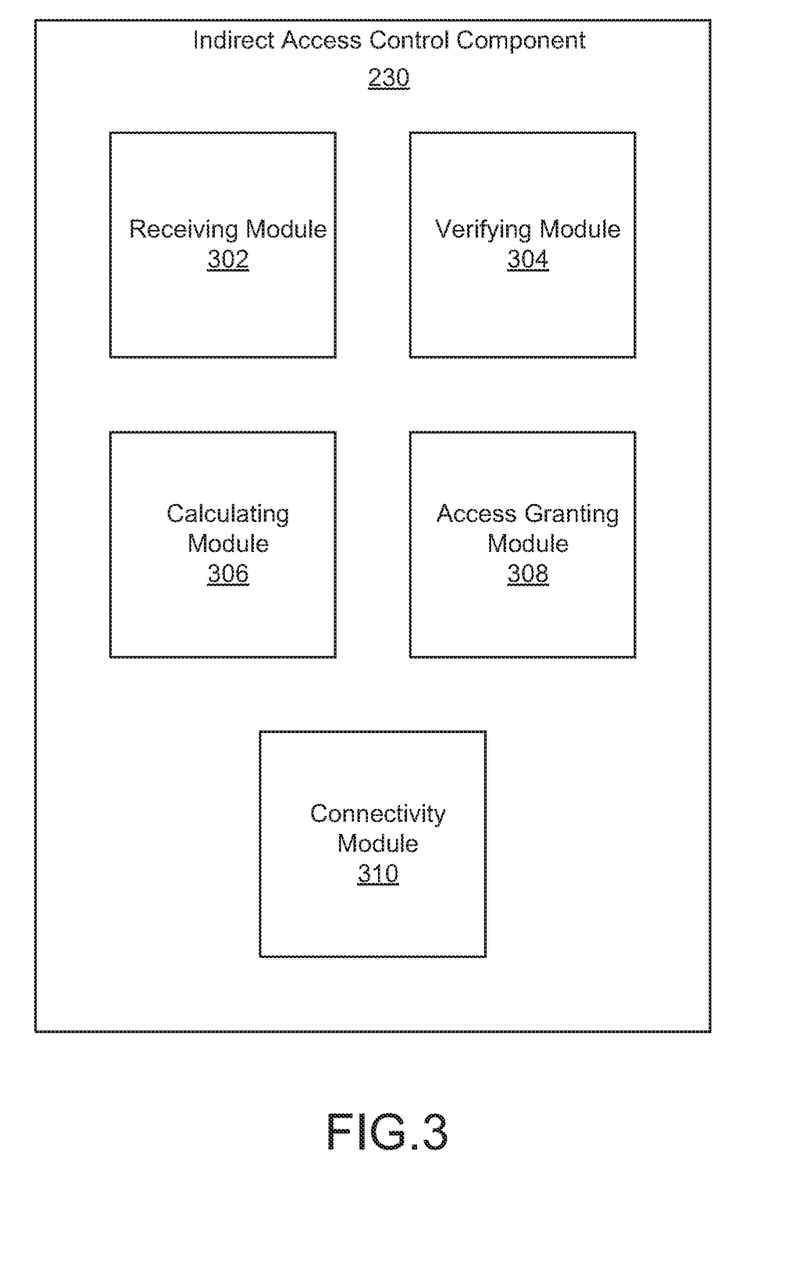
FIG. 3 is a block diagram of an indirect access control component, according to some embodiments.

FIG. 3 is a block diagram of the indirect access control component 230. The indirect access control component 230 includes a receiving module 302, a verifying module 304, a calculating module 306, an access granting module 308 and a connectivity module 310. FIGS. 4 and 5 are also discussed below in conjunction with FIG. 3 as appropriate. In particular, FIG. 4 is a schematic drawing of peer trust relationships between several smart devices 102, and FIG. 5 is a flowchart of a method 500 for indirect access control.

A separate indirect access component 230 can reside on each smart device 102 in the local area network 104. In some embodiments, the functionalities of the indirect access component 230 can be implemented on other computing devices, or can be distributed between multiple computer systems. It is to be understood that although the indirect access component 230 is illustrated in FIG. 3 as a standalone entity, the indirect access component 230 represents a collection of functionalities, which can be instantiated as a single or as multiple modules on one or more computing devices as desired. FIG. 3 illustrates a specific embodiment in which the indirect access component 230 is instantiated in the form of specific, multiple modules. In other embodiments, the functionalities of the indirect access component 230 are distributed and/or instantiated in other ways.

The modules of the indirect access component 230 can be instantiated (for example as object code or executable images) within the system memory 217 (e.g., RAM, ROM, flash memory) of a computing device, such that when a processor processes a module, the computing device executes the associated functionality. Additionally, program code to implement the functionalities of the indirect access component 230 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In general, the indirect access control component 230 provides a way to handle access control and authentication for a smart device 102. For instance, the indirect access control component 230 may provide access control when the connection 106 is unavailable and thus an access control service within the cloud service 112 is unavailable for access control. In one embodiment, the indirect access control component 230 uses multi-factor authentication including historically accessed and currently connected devices 102 to simplify access control amongst smart devices 102.

In one embodiment, a requestor smart device 102a attempts to access a requestee smart device 102b and the requestee smart device 102b is unable to authenticate the request from a built-in database or an online source. The requestee smart device 102b may then request from the requestor smart device 102a a set of information from a series of previous devices 102 that the requestor smart device 102a has been granted authenticated access to. For example, the receiving module 302 in the requestee smart device 102b may receive 502 peer data that asserts that the requestor smart device 102a is trusted by one or more peer devices 102 (e.g. smart device 102c).

The requestee smart device 102b may then communicate with those peer devices 102 that the requestor smart device 102a has been granted authenticated access to. In one embodiment, the requestee smart device 102b may use an independent authentication model to validate the peer data provided by the requestor smart device 102a. For example, the requestee smart device 102b may generate a separate challenge based on the peer data. In one embodiment, the requestee smart device 102b may generate a signature that is based on the peer data. By comparing the data of the requestee smart device's 102b independent authentication model data with the peer data, the verifying module 304 can partially validate the requestor smart device's 102a identity. For instance, the verifying module 304 may verify that the requestor smart device 102 has a first degree of trust with a peer computing device (e.g. 102c). This process of receiving 506 peer data and verifying 508 the peer data may be performed multiple times by the receiving module 302 and the verifying module 304, respectively. In one embodiment, the number of iterations may be based on a predefined number of successive peer degrees. The specific predefined number to use in this context is a variable design parameter that can vary between embodiments.

Figure 4:
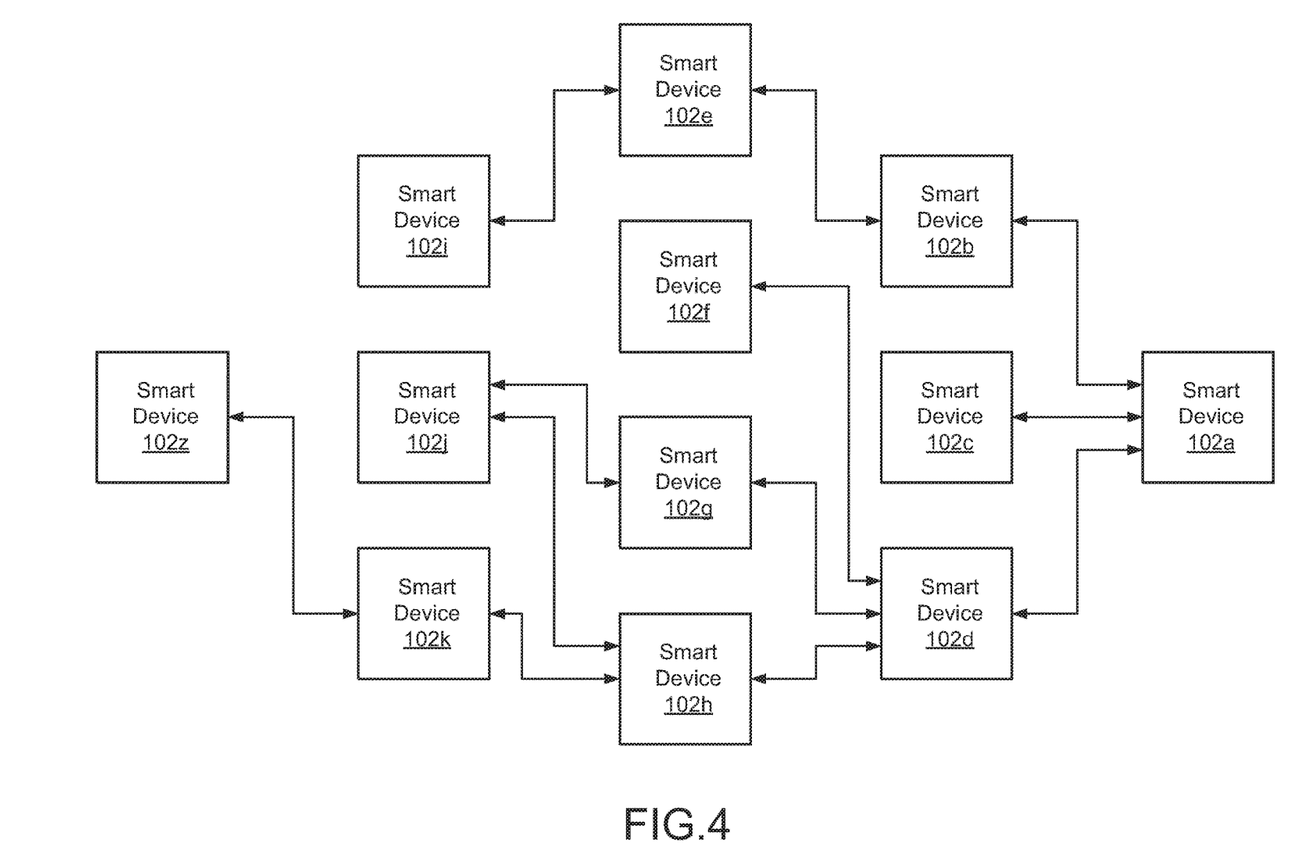
FIG. 4 is a schematic drawing of peer trust relationships between several smart devices, according to some embodiments.
Figure 5:
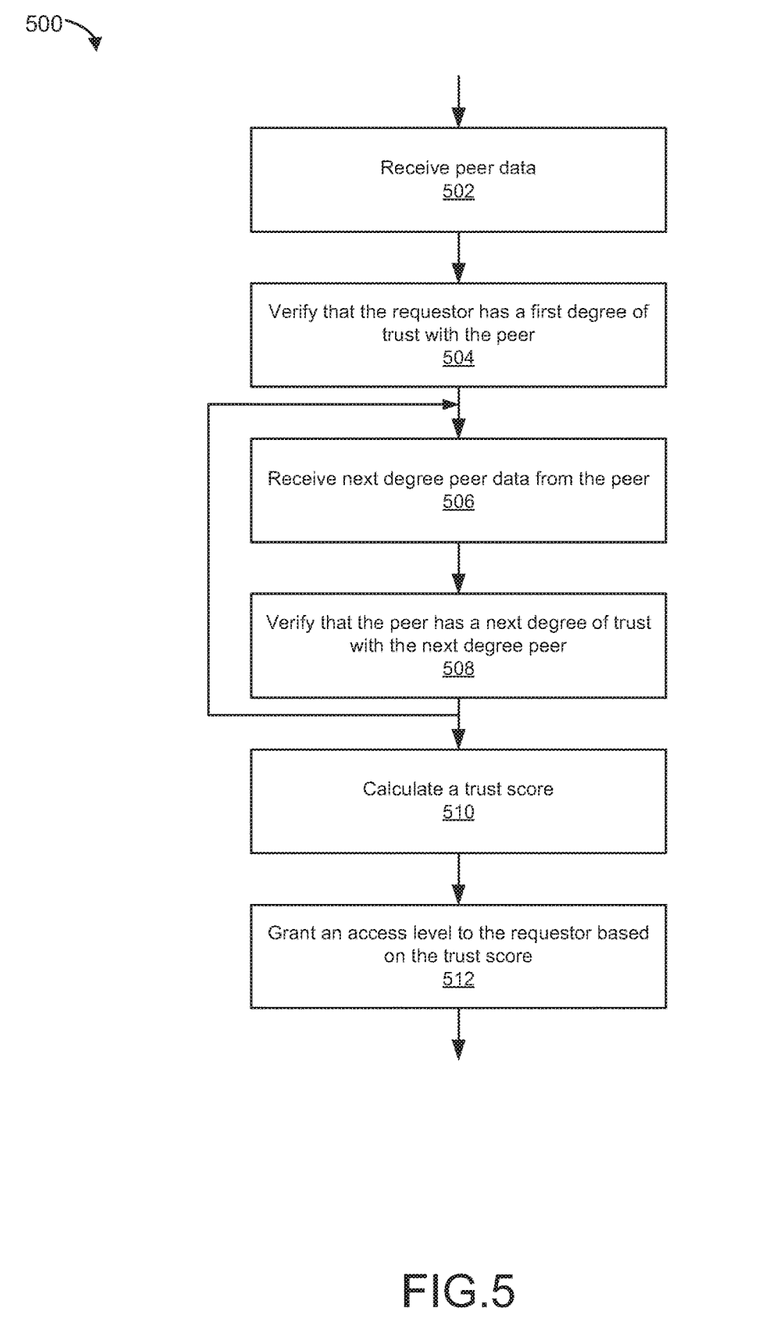
FIG. 5 is a flowchart of a method for indirect access control, according to some embodiments.

In some cases a trust relationship may exist directly between two smart devices 102, for example 102a and 102b as depicted in FIG. 4. In other cases, there may be several peer degrees of separation between two smart devices 102, for example 102a and 102z as depicted in FIG. 4. In the case of smart device 102 and smart device 102z there may be four peer degrees of separation.

In combining the peer data the requestee smart device has received from the requestor smart device and the compared validation data that the requestee smart device has created from the requestee smart device's networks of direct and indirect peers, the requestee smart device may make a risk based score. For example, the calculating module 306 may calculate 510 a trust score for the requestor smart device based on the verification of the peer data and the next degree peer data.

In one embodiment, the trust score is based on the quality of the data that the requestee smart device has verified. For instance, a 2048-bit based signature may be given higher quality weighting than a 32-bit based signature. In one embodiment, the trust score is based on the duration of time that the requestee smart device has been able to validate that the trust relationship(s) have existed. For example, the peer data may assert, and the requestee smart device may validate, that the relationship between the requestor smart device and the peer has been established for a certain amount of time, with longer periods of time typically indicating greater trust.

In one embodiment, the trust score may be based on the peer degree of separation. For example, if the requestor smart device was 102*d* and the requestee smart device was 102*j* as depicted in FIG. 4, the peer degree of separation would be two, namely through smart devices 102*g* and 102*h* with which both the requestor smart device was 102*d* and the requestee smart device was 102*j* have an establish trust relationship. In some cases, the trust score may be based on the summation of multiple trust paths. Again, in the case of the requestor smart device being 102*d* and the requestee smart device being 102*j* as depicted in FIG. 4, the trust score may take into account that there are two trust paths with a second degree peer of separation. In contrast, there is only one trust path with a second degree of separation between smart device 102*i* and the smart device 102*b*, namely through the smart device 102*e*. As a further example, there are several trust paths with a third degree of separation or higher between smart device 102*f* and smart device 102*k* (e.g. through 102*d* and 102*h*; through 102*d*, 102*g*, 102*j* and 102*h*; etc.). Thus, the calculating module 306 may base the risk score on several factors by applying linear or non-linear weightings to the factors.

Based on the risk score calculated by the calculating module 306, the access granting module 308 may grant 512 an access level to the requestor computing device. For example, a limited set of permissions may be granted, while other available permissions may continue to be denied. For instance, permission may be granted to unlock a front door of a smart home, while permissions to disable security surveillance or modify control heating, ventilation and air conditioning (HVAC) settings may be denied. In instances where there is a greater level of trust (e.g. a lower risk score), generally more permissions may be granted to the requestor. In some cases, the set of permissions granted to the requestor may be based on the peer degree of separation between the requestor and the requestee (e.g. fewer degrees of peer degree separation may result in a lower risk score). In one embodiment, the calculating module 306 may also base the trust score on exigent circumstances identified by the smart device 102. For instance, the connectivity module 310 may identify that the smart device 102 has limited connectivity to the network 108. In such a case, a permission may be granted to allow a configuration setting to be modified in order to re-establish connectivity. A specific set of emergency capabilities may be utilized where some level of trust is established in order to allow a certain degree of usage. An example of such an emergency capability includes unlocking a car door or allowing the car to be driven, e.g., a specific number of miles and/or in a specific direction in order to establish communication with the cloud service 112, and/or obtain an updated authorization model.

In one embodiment, a connected vehicle may normally use the cloud service 112 for access control in unlocking doors on the connected vehicle. However, in the event that the connected vehicle has lost the connection 106, the indirect access control component 230 may allow the connected vehicle to be unlocked with a smart device 102 where a sufficient trust score is established.

In one embodiment, the indirect access control component 230 may allow access control to a smart home to a visitor with a smart device 102 without having to pair the smart device 102 to every individual device 102. For example, the visitor's smart device 102 may be authenticated to a single device 102 and then the indirect access control component 230 may allow the visitor's smart device 102 to access and control the other devices 102 in the smart home through the indirect access control method described with references to FIG. 5.

In one embodiment, the indirect access control component 230 may allow users to minimize time spent configuring access control on their smart devices 102. As a simple example, a user may have smart lights, a smart refrigerator and a smart microwave. When the user buys a new phone, the user may be able to leverage the indirect access control component 230 to provide his new phone permissions to control the smart lights, the smart refrigerator and the smart microwave without having to pair the new phone with each individual device 102 separately. Moreover, use of the indirect access control component 230 may provide devices 102 the freedom to forego cloud-based access control schemes such as that discussed above with regard to the cloud service 112.

In one embodiment, the indirect access control component 230 may allow a user with multiple smart devices 102 to effectively share some level of access control to all of the multiple devices 102 with other trusted users in a simple manner. For example, a user with a connected vehicle may get in the connected vehicle with her daughter and the daughter's friend to drive them to some activity. The daughter's friend might want to start playing music through the car stereo from her phone. Using the indirect access control component 230, an existing trust relationship between the daughter's friend's smart device 102, the daughter's smart device 102, and the connected vehicle may allow the daughter's friend to play music through the car stereo without resorting to an elaborate pairing process. However, the daughter's friend may continue to be denied the ability to start and drive the connected vehicle based on the calculated risk score. In the connected vehicle example, a peer degree of separation over a predefined threshold may be denied the ability to unlock, start and drive the connected vehicle.

In one embodiment, the peer data and the next degree peer data may include metadata describing access control permissions respectively granted to the one or more peer computing devices 102 and the one or more next degree peer computing devices 102. The metadata may enrich the peer data so that the peer data not only describes which smart devices 102 an individual smart device trusts, but also with what the individual smart devices 102 trust those peer smart devices 102. In one embodiment, the metadata may include a trust score, an access level, or particular access control permissions that a peer computing device has entrusted a smart device with. In some cases, the metadata may be forwarded down a trust path so that the requestee has a chain of metadata describing limits of the trust at the different peer degrees. The trustee may base the trust score on the metadata. In some instances, the trust score may be based on the cumulative trust at each peer level. In one embodiment, the metadata may include data regarding the cloud service 112. In such a scenario, the indirect access control component 230 may provide a hybrid access control solution to peer devices 102.

As an illustrative example, the smart device 102*a* may be the requestor and the smart device 102*i* may be the requestee. The metadata associated with the peer data describing the trust relationship between the smart device 102a and the smart device 102b may grant privileges l, m, n and o, but deny permission to privileges p, q and r. Meanwhile, the metadata associated with the peer data describing the trust relationship between the smart device 102b and the smart device 102e may grant privileges l, m, p and q, but deny permission to privileges n, o and r. The metadata associated with the peer data describing the trust relationship between the smart device 102e and the smart device 102i may grant privileges l, and o, but deny permission to privileges m, n, p, q and r. In such a scenario, the indirect access control component 200 and the method 500 may be designed to handle the metadata in a variety of ways. For instance, the requestee, smart device 102i, may grant only privilege l in one embodiment, since the l privilege is common across each peer degree in the trust path from smart device 102a to smart device 102i. In other embodiments, the granted privileges at each trust level may be weighed differently. For instance, since privilege m and privilege o are common across two of the three peer degrees, in some embodiments the same privileges (e.g. m and o) may be granted. In some embodiments, distinct privileges (e.g. privileges s and t) may be based on the granted privileges at various peer degrees of the trust path.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for indirect access control, at least a portion of the method being performed by a computing device comprising at least one processor, the method comprising the steps of:
   receiving, by a requestee computing device, peer data from a requestor computing device, the peer data asserting that the requestor computing device is trusted by one or more peer computing devices;
   verifying, by the requestee computing device, that the requestor computing device has a first degree of trust with at least one specific peer computing device based on communication of the peer data with the one or more peer computing devices;
   receiving, by the requestee computing device, next degree peer data from the at least one specific peer computing device, the next degree peer data asserting that the at least one specific peer computing device is trusted by one or more next degree peer computing devices;
   verifying, by the requestee computing device, that the at least one specific peer computing device has a next degree of trust with at least one specific next degree peer computing device based on communication of the next degree peer data with the one or more next degree peer computing devices;
   calculating, by the requestee computing device, a trust score for the requestor computing device based on the verification of the peer data and the next degree peer data; and
   granting, by the requestee computing device, an access level to the requestor computing device based on the trust score.

2. The method of claim 1, wherein receiving next degree peer data and verifying that the at least one specific peer computing device has a next degree of trust is performed iteratively for each of a predefined number of successive peer degrees.

3. The method of claim 2, wherein the predefined number is based on the requestee computing device having a common chain of peer computing devices, and the trust score is further based on a degree of separation between the requestor computing device and the requestee computing device.

4. The method of claim 1, wherein the trust score is further based on a number of peer computing devices and next degree peer computing devices that are verified as directly or indirectly trusting the requestor computing device.

5. The method of claim 1, wherein the trust score is further based on how long the first degree of trust and the next degree of trust have been maintained.

6. The method of claim 1, wherein the requestor computing device, the one or more peer computing devices, the one or more next degree peer computing devices and the requestee computing device are smart devices capable of managing access control in coordination with a cloud service, the method further comprising determining available connectivity with the cloud service, wherein the trust score is further based on the determined available connectivity with the cloud service.

7. The method of claim 6, wherein the requestor computing device or the requestee computing device are a connected computerized vehicle and the access level is limited based on distance the connected computerized vehicle travels from an authentication point.

8. The method of claim 1, wherein the peer data and the next degree peer data include metadata describing access control permissions respectively granted to the one or more peer computing devices and the one or more next degree peer computing devices.

9. A computer system for performing indirect access control, the computer system comprising:
   system memory;
   a receiving module residing in the system memory, the receiving module being programmed to receive peer data from a requestor computing device, the peer data asserting that the requestor computing device is trusted by one or more peer computing devices;
   a verifying module residing in the system memory, the verifying module being programmed to verify that the requestor computing device has a first degree of trust with at least one specific peer computing device based on communication of the peer data with the one or more peer computing devices;
   the receiving module being further programmed to receive next degree peer data from the at least one specific peer computing device, the next degree peer data asserting that the at least one specific peer computing device is trusted by one or more next degree peer computing devices;

the verifying module being further programmed to verify that the at least one specific peer computing device has a next degree of trust with at least one specific next degree peer computing device based on communication of the next degree peer data with the one or more next degree peer computing device;

a calculating module residing in the system memory, the calculating module being programmed to calculate a trust score for the requestor computing device based on the verification of the peer data and the next degree peer data; and an accessing granting module residing in the system memory, the accessing granting module being programmed to grant an access level to the requestor computing device based on the trust score; and at least one processor configured to execute the modules.

10. The computer system of claim 9, wherein the receiving module and the verifying module respectively being further programmed to iteratively perform receiving next degree peer data and verifying that the at least one specific peer computing device has a next degree of trust for each of a predefined number of successive peer degrees.

11. The computer system of claim 10, wherein the number is based on a requestee computing device having a common chain of peer computing devices, and the trust score is further based on a degree of separation between the requestor computing device and the requestee computing device.

12. The computer system of claim 9, wherein the trust score is further based on a number of peer computing devices and next degree peer computing devices that are verified as directly or indirectly trusting the requestor computing device.

13. The computer system of claim 9, wherein the trust score is further based on how long the first degree of trust and the next degree of trust have been maintained.

14. The computer system of claim 9, wherein the requestor computing device, the one or more peer computing devices, the one or more next degree peer computing devices and a requestee computing device are smart devices capable of managing access control in coordination with a cloud service, the computer system further comprising a connectivity module residing in the system memory, the connectivity module being programmed to determine available connectivity with the cloud service, wherein the trust score is further based on the determined available connectivity with the cloud service.

15. The computer system of claim 14, wherein the requestor computing device or the requestee computing device are a connected computerized vehicle and the access level is limited based on distance the connected computerized vehicle travels from an authentication point.

16. The computer system of claim 9, wherein the peer data and the next degree peer data include metadata describing access control permissions respectively granted to the one or more peer computing devices and the one or more next degree peer computing devices.

17. At least one non-transitory computer readable-storage medium for indirect authentication, the at least one non-transitory computer readable-storage medium storing computer executable instructions that, when loaded into computer memory and executed by at least one processor of a computing device, cause the computing device to:

receive peer data from a requestor computing device, the peer data asserting that the requestor computing device is trusted by one or more peer computing devices;

verify that the requestor computing device has a first degree of trust with at least one specific peer computing device based on communication of the peer data with the one or more peer computing devices;

receive next degree peer data from the at least one specific peer computing device, the next degree peer data asserting that the at least one specific peer computing device is trusted by one or more next degree peer computing devices;

verify that the at least one specific peer computing device has a next degree of trust with at least one specific next degree peer computing device based on communication of the next degree peer data with the one or more next degree peer computing devices;

calculate a trust score for the requestor computing device based on the verification of the peer data and the next degree peer data; and grant an access level to the requestor computing device based on the trust score.

18. The non-transitory computer readable-storage medium of claim 17, wherein receiving next degree peer data and verifying that the at least one specific peer computing device has a next degree of trust is performed iteratively for each of a predefined number of successive peer degrees.

19. The non-transitory computer readable-storage medium of claim 18, wherein the predefined number is based on a requestee computing device having a common chain of peer computing devices, and the trust score is further based on a degree of separation between the requestor computing device and the requestee computing device.

20. The non-transitory computer readable-storage medium of claim 17, wherein the trust score is further based on a number of peer computing devices and next degree peer computing devices that are verified as directly or indirectly trusting the requestor computing device.

* * * * *